Oct. 30, 1923.　　　　　　　　　　　　　　　　1,472,724
T. J. McCLOSKEY
TRANSMISSION MECHANISM
Filed Jan. 25, 1922　　　3 Sheets-Sheet 3
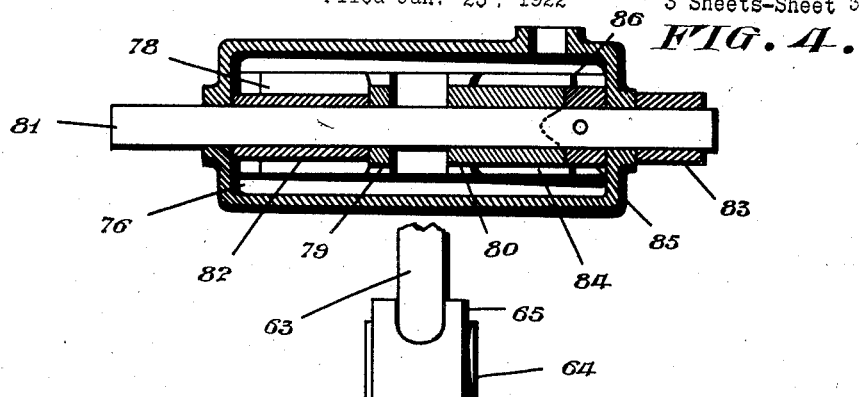
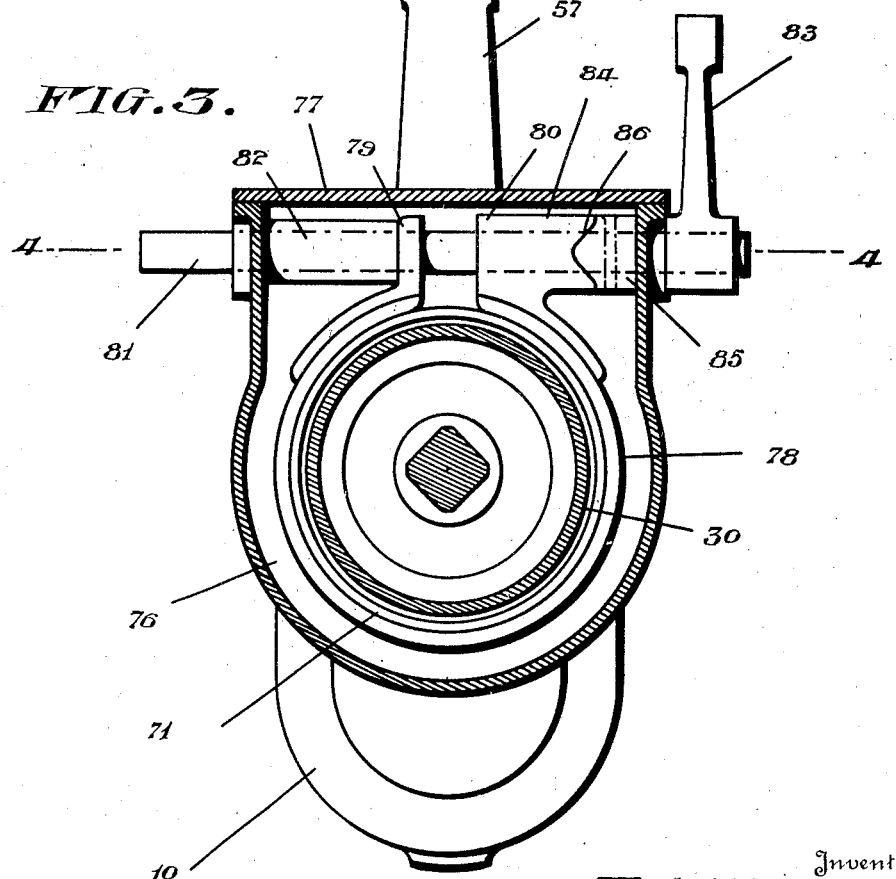
Inventor:
T. J. McCLOSKEY,
By W. J. Fitzgerald & Co.
Attorney.

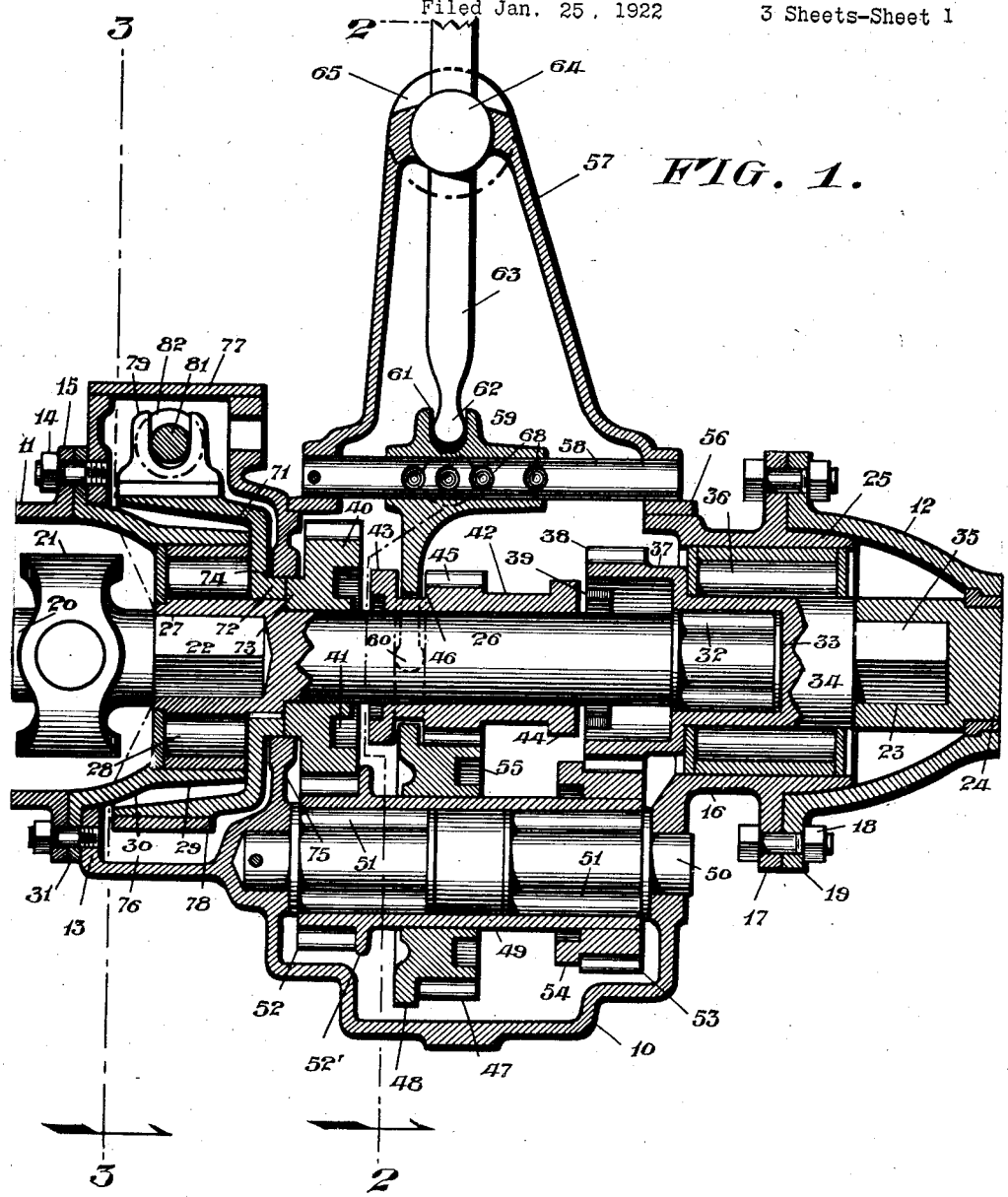

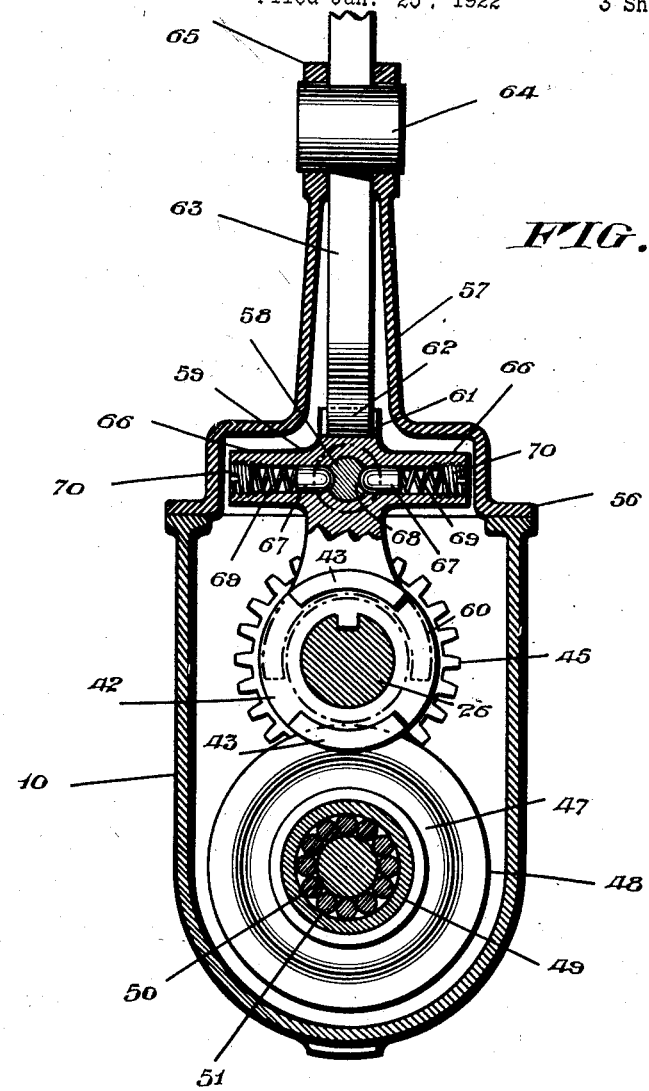

Patented Oct. 30, 1923.

1,472,724

UNITED STATES PATENT OFFICE.

THOMAS J. McCLOSKEY, OF SEATTLE, WASHINGTON, ASSIGNOR TO UNIVERSAL TRANSMISSION COMPANY, OF SEATTLE, WASHINGTON.

TRANSMISSION MECHANISM.

Application filed January 25, 1922. Serial No. 531,706.

*To all whom it may concern:*

Be it known that I, THOMAS J. McCLOSKEY, a citizen of the United States, residing at Seattle, in the county of King and State of Washington, have invented certain new and useful Improvements in Transmission Mechanisms; and I do hereby declare the following to be a full, clear, and exact description of the invention, such as will enable others skilled in the art to which it appertains to make and use the same.

The present invention relates to transmission mechanisms, and appertains more particularly to variable speed transmission gearing using clutches for obtaining various speed ratios.

It is an object of the invention to provide a variable speed transmission gearing comprising a novel arrangement and combination of gears and clutches, for obtaining a desired variety of speed ratios or changes by the simple forward and backward movement of a hand lever or other controlling member.

Another object is the provision of such a mechanism comprising a novel construction having improved details, to enhance the utility and efficiency of the device, and providing a compact and serviceable mechanism.

A further object is the provision of such a gear mechanism having a novel and efficient shifting device for changing the speed ratios.

A still further object is to incorporate in the transmission mechanism a novel and improved brake, which requires very little extra space in the structure.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:—

Figure 1 is a vertical median section of the transmission mechanism, portions being shown in elevation.

Figs. 2 and 3 are vertical cross sections taken on the respective lines 2—2 and 3—3 of Fig. 1.

Fig. 4 is a horizontal section of the brake-operating device, taken on the line 4—4 of Fig. 3.

The gears are housed within a casing 10, which, as shown, is of such form and construction that it may be interposed between the rear end of an ordinary transmission housing 11 of an automobile engine, and the propeller shaft housing 12, although the present mechanism is not limited to such use. However, the mechanism can, if desired, be used as an auxiliary or supplementary speed change mechanism between the usual speed-change mechanism and propeller shaft, in which relation the present mechanism is shown in Fig. 1. Thus, the forward end of the casing 10 has an inturned flange 13 adapted to be secured by bolts 14 to the outturned flange 15 at the rear end of the housing 11, and the casing 10 has a neck 16 at its rear end provided with an outturned flange 17 to be fastened by bolts 18 to the outturned flange 19 on the forward end of the housing 12. Thus, in using the mechanism in this relation, the drive shaft 20 of the main or primary transmission mechanism has the universal joint 21 at its rear end provided with the stub 22, and the propeller shaft 24 located within the housing 12 has a socket 23 which ordinarily receives the stub 22, when the housings 11 and 12 are secured directly together. In other words, with the present mechanism removed, the flanges 15 and 19 are secured together, so that the stub 22 fits within the socket 23, thereby driving the shaft 24 from the shaft 20; whereas, in using the present mechanism, the housings 11 and 12 are separated and the casing 10 is secured between and to the adjacent ends of said housings. As shown, the neck 16 projects beyond the flange 17, as at 25, to fit within the forward enlarged end of the housing 12.

The present transmission mechanism includes a shaft 26 mounted within the casing 10 between and in line with the shafts 20 and 24, and the shaft 26 has a socket 27 in its forward end, similar to the socket 23, for receiving the stub 22, whereby the shaft 26 is driven by and with the shaft 20. The forward terminal of the shaft 26 is rotatable within a roller bearing 28 mounted within the rearwardly-extending cuff 29 of a flared annular member 30 which has an outturned flange 31 clamped between the flanges 13 and 15. The rear terminal of the shaft 26 is mounted in a roller bearing 32 disposed within a forwardly-opening recess 33 of a journal member 34. Said journal member has a stub 35 at its rear end to enter the socket 23, whereby the propeller shaft 24 rotates with the member 34. The member 34 is mounted for rotation in a roller bearing 36 which is fitted within the neck 16. Thus, the forward end of the shaft 26 is mounted for rotation in a bearing at the forward end of the casing 10, while the rear end of said shaft is mounted in the bearing in the member 34 which is in turn mounted in a bearing within the rear end portion of the casing.

The journal member 34 has a cup-shaped rim portion 37 at its forward end surrounding and spaced from the shaft 26, and formed thereon with external gear teeth 38, forming a gear wheel, and said portion 37 has clutch lugs 39 on the interior at the edge or mouth of said portion. A gear wheel 40 is mounted loosely on the shaft 26 near the forward end thereof, and has a clutch socket 41. A clutch sleeve and gear member 42 are slidable on the shaft 26 between the gear wheel 40 and journal member 34, and is feathered or splined to said shaft, in order to rotate with the shaft 26. The sleeve 42 is formed at its forward and rear ends with the clutch lugs or portions 43 and 44, respectively, to engage the clutch socket 41 and clutch lugs 39, respectively, when the sleeve 42 is shifted forwardly and rearwardly. The lugs 43 in entering the socket 41 will lock the gear wheel 40 and sleeve 42 together, thereby rotating the gear wheel 40 with the sleeve 42 and shaft 26, and the lugs 44 in passing between the lugs 39, will lock the journal member 34 to the shaft 26, to rotate the member 34 and shaft 24 with the shaft 26. The lugs 44 can be moved beyond the lugs 39 in order to disconnect the member 34 from the shaft 26, that is, for rotation together.

The sleeve 42 is formed between the clutch lugs 43 and 44 with external gear teeth forming a gear wheel 45, and the sleeve is formed at one side of the gear wheel 45 with an annular groove 46. A gear wheel 47 meshes with the gear wheel 45 and is shrouded at one side by an annular flange 48 which enters the groove 46, thereby compelling the gear wheel 47 to be shifted or slid with the sleeve 42 backward and forward. The gear wheel 47 is mounted loosely on a sleeve shaft 49 which is mounted for rotation on an arbor 50 having its terminals secured within a dropped portion of the casing 10 below the shaft 26. Roller bearings 51 are disposed between the shaft 49 and arbor 50, for the free rotation of said shaft. The tubular shaft 49 has a gear wheel 52 thereon at its forward end meshing with the gear wheel 40, and said shaft 49 has a gear wheel 53 at its rear end meshing with the gear wheel 39, the gear wheel 47 being slidable between the gear wheels 52 and 53. The gear wheel 52 is also shrouded by the flange 52' which overlaps the gear wheel 40 and holds said gear wheel 40 in place. The gear wheel 53 has clutch lugs 54 to enter a clutch socket 55 in the rear side of the gear wheel 47, when the sleeve 42 is slid rearwardly to the limit, with the lugs 44 moved beyond the lugs 39.

The casing 10 has a cover 56 formed with an upstanding hollow post or standard 57, and a guide rod 58 has its terminals secured in the base portion of the post 57 above and parallel with the shaft 26. A clutch shifter 59 is slidable on the rod 58, and has a depending fork 60 straddling the sleeve 42 and engaging in the groove 46, whereby to slide the sleeve 42 with the member or shifter 59. Said member 59 has an upper notch or slot 61 receiving the lower rounded end 62 of a hand lever 63 which extends through a fulcrum member 64 mounted for oscillatory movement in the upper end portion of the post 57. Said post is formed at its upper end with a bearing 65 for the fulcrum member 64, and the lower arm of the lever is swingable forward and rearwardly within the post 57 to slide or shift the member 59. The sleeve 42 moves with the member 59 and the gear wheel 47 moves with the sleeve 42, so that the member 59, sleeve 42, and gear wheel 47 are shifted as a unit.

Means are provided for retaining the shiftable parts in the different positions, and such means includes opposite bosses 66 projecting from the sides of the member 59, and said bosses are tubular or hollow. Pins or catches 67 are slidable in the inner ends of the bosses 66 and have rounded ends to snap into concaved notches 68 in the opposite sides of the rod 58, and coiled expansion springs 69 are disposed within said bosses and are confined between the pins 67 and plugs 70 screw-threaded into the outer ends of said bosses. The notches 68 are so arranged or spaced apart as to receive the pins 67 when the shiftable members are moved to their different positions, thereby retaining them in such positions against accidental shifting movement, although when the lever 63 is swung manually, the pins or catches 67 will be forced back into the bosses 66 out of the corresponding notches to snap into the next adjacent notches when the member 59 is slid.

The brake, which is incorporated in the mechanism, includes a cup-shaped brake drum 71 secured or keyed on the shaft 26, within the forward end portion of the casing 10, with its flange or rim projecting forwardly. The hub 72 of the drum 71 is secured on said shaft 26, and abuts the hub 73 of the gear wheel 40, as shown, and said hubs are rotatable within an opening 74 in a partition 75 of the casing. Said partition divides the casing into a main compartment or chamber in which the gears and clutches are located, and a forward brake chamber or compartment 76 in which the brake drum 71 is located, with the rim of the drum surrounding the member 30. The chamber 76 has a removable cover 77 for access to the brake device.

A brake band 78 surrounds the rim of the drum 71 and has the terminal ears or portions 79 and 80 fitted slidably on a transverse rock shaft 81 journaled within the sides of the chamber 76 above the brake drum. A spacer 82 is disposed on said shaft between the ear 79 and corresponding side walls of the casing, and an arm 83 is secured to one protruding end of the shaft, for the oscillating movement of said shaft by any suitable operating device. In order to contract the brake band 78, the ear or portion 80 has a sleeve 84 on the shaft 81 projecting toward the corresponding side wall of the casing, and a collar 85 is secured on said shaft to turn therewith. The adjacent abutting ends of the sleeve 84 and collar 85 have cam faces 86, which will compel the sleeve 84 to be slid toward the ear 79, when the shaft is turned, thereby moving the ends of the brake band toward one another, for causing the brake band to grip or embrace the brake drum 71, and thus retard or stop the rotation of the shaft 26 and parts connected thereto.

In operation, the several speed changes are obtained by the simple forward and backward swinging movement of the hand lever 63 to different positions. When the hand lever is swung to the position as seen in Fig. 1, the mechanism is a neutral position, with all of the clutches open. By swinging the hand lever 63 to move the member 59 forwardly, the sleeve 42 is slid forwardly to engage the clutch lugs 43 in the clutch socket 41 of the gear wheel 40, thereby connecting the gear wheel 40 with the shaft 26 to rotate therewith. The gear wheel 40 will rotate the gear wheel 52 and sleeve shaft 49, thereby rotating the gear wheel 43 which transmits the motion to the gear wheel 38 and journal member 34, so as to rotate the shaft 24. When the sleeve 42 is shifted rearwardly from neutral position one step, the clutch lugs 44 engage between the clutch lugs 39, thereby connecting the journal member 34 with the shaft 26 and resulting in the journal member 34 and propeller shaft 24 rotating with the shaft 26. By moving the sleeve 42 rearwardly another step, the clutch lugs 44 are moved from between and rearwardly of the lugs 39, thereby disconnecting the journal member 34 from the shaft 26, and the gear wheel 47 is then brought into engagement with the gear wheel 53, the clutch lugs 54 engaging in the clutch socket 55, whereby the gear wheel 47 in being driven by the gear wheel 45 of the sleeve 42, will rotate the gear wheel 53 and transmit the motion to the journal member 34 and shaft 24. The shifting of the sleeve 42 and gear wheel 47 is of course done when the main clutch (not shown) is open, to avoid the stripping of gears or breakage of other parts.

Three speeds are thus obtained. Thus, when the sleeve 42 engages the gear wheel 40, said gear wheel 40 being of larger diameter than the gear wheel 52, will rotate the shaft 49 faster than the shaft 26, thereby rotating the shaft 24 faster than said shaft 26. When the sleeve 42 has its lugs 44 engaged with the lugs 39, the shaft 24 is rotated at the same speed as the shaft 26. When the gear wheel 47 is engaged with the gear wheel 53, the gear wheel 45 being of smaller diameter than the gear wheel 47 will rotate the shaft 49 and gear wheel 53 slower than the shaft 26, whereby the shaft 24 is rotated slower than said shaft 26. In this way, in the three different clutch positions of the mechanism, the shaft 24 which is driven by the mechanism can be made to rotate faster than, at the same speed as, or slower than the shaft 26. The mechanism thus provides an efficient supplementary or auxiliary speed changing gearing, which is especially useful on trucks, or other vehicles having varying loads. If the mechanism is used in conjunction with the usual or main transmission mechanism, the speed changes of the primary transmission mechanism are multiplied by three. In other words, with each speed change of the main transmission mechanism, each of the speed changes of the present mechanism can be used, so that if the main mechanism has three speed changes, the three speed changes of the present mechanism will provide for six speed changes in using the two mechanisms in combination.

Having thus described the invention, what is claimed as new is:—

1. A transmission gearing comprising a shaft, a second shaft, a third shaft parallel with the first named shaft, a member rotatable with the second shaft, a sleeve slidable on and rotatable with the first named shaft, said member and sleeve having clutch portions to engage one another in one position of said sleeve, gears connecting said member and third shaft, a wheel slidable on the third shaft and geared to and movable with said sleeve, clutch portions between said wheel and third shaft to connect said wheel and third shaft in another position of said sleeve, and a wheel rotatable relatively to the first named shaft geared to the third shaft, the last named wheel and sleeve having clutch portions to engage in still another position of the sleeve.

2. In a transmission gearing, a shaft, a second shaft parallel therewith, a sleeve slidable on and rotatable with the first named shaft, a gear wheel mounted loosely on the second shaft, said sleeve having gear teeth meshing with said wheel, said sleeve and wheel having interengaging portions for sliding one with the other including an annular groove in one of them and an annular flange on the other engaging in said groove, and gears for the engagement of said sleeve and wheel when slid to different positions.

3. In a transmission mechanism a shaft, a second shaft in alinement therewith, a third shaft parallel with the first named shaft, a gear wheel rotatable with the second shaft, a gear wheel secured to the third shaft and meshing with the first named gear wheel, another gear wheel on the third shaft, a gear wheel meshing with the third named gear wheel and mounted loosely on the first named shaft, a sleeve slidable on and rotatable with the first named shaft between the first and fourth named gear wheels and having a gear wheel thereon, and a gear wheel mounted loosely on the third shaft and meshing with the fifth named gear wheel and slidable as a unit with said sleeve, said sleeve and first and fourth named gear wheels having clutch portions to engage in different positions of said sleeve, the second and sixth gear wheels having clutch portions to engage in still another position of the sleeve, one of said clutch portions being engageable and then disengageable in one movement of said sleeve to bring another one of said clutch portions into engagement.

4. In a transmission gearing, a shaft, a member having a cupped portion surrounding said shaft and formed with a gear wheel thereon, a second shaft geared to said gear wheel, a sleeve slidable on and rotatable with the first named shaft, one end of the sleeve being movable into said portion and said sleeve and portion having clutch lugs to engage and disengage when the sleeve is moved into said portion, and gears and clutch portions between said sleeve and second shaft to connect the shafts when the sleeve is in a position with said clutch lugs disengaged.

5. A transmission gearing including a shaft, a member rotatable about the axis thereof and having a cup-shaped portion surrounding the shaft and formed thereon with a gear wheel, a second shaft having a gear wheel meshing with the first named gear wheel, a sleeve slidable on and rotatable with the first named shaft, one end of the sleeve being movable into said portion and said end of the sleeve and portion having clutch lugs to engage one another and disengage when the sleeve is moved into said portion, a gear wheel mounted loosely on the second shaft and geared to and slidable with said sleeve, and clutch portions between the second and third named gear wheels to engage one another when the lugs of the sleeve have been moved past the lugs of said portion.

6. A transmission gearing including a shaft, a member rotatable about the axis thereof having a cup-shaped portion surrounding said shaft and formed thereon with a gear wheel, a second shaft parallel with the first named shaft, a gear wheel secured on the second shaft and meshing with the first named gear wheel, a sleeve slidable on and rotatable with the first named shaft, one end of the sleeve being movable into said portion and said end of the sleeve and portion having clutch lugs to engage one another and disengage when the sleeve is moved into said portion, a gear wheel mounted loosely on the second shaft and geared to and slidable with said sleeve, the second and third named gear wheels having clutch portions to engage when the lugs of the sleeve are moved past the lugs of said portion, and a gear wheel mounted loosely on the first named shaft and geared to the second shaft, the last named gear wheel and sleeve having clutch portions to engage when the sleeve is withdrawn from said cup-shaped portion.

7. In a transmission gearing, a journal member having a recess, a shaft having one end mounted for rotation in said recess, said journal member having a cup-shaped portion surrounding said shaft and formed thereon with a gear wheel, a second gear wheel meshing with said gear wheel, a sleeve slidable on and rotatable with said shaft, one end of the sleeve being movable into said portion and said end of the sleeve and portion having clutch lugs to engage and then disengage when the sleeve is moved into said portion, and means for connecting the second named gear wheel and shaft when the lugs of the sleeve have been moved past the lugs of said portion in entering said portion.

8. A transmission gearing comprising a shaft, a journal member having a recess receiving one end of said shaft and having a cup-shaped portion surrounding said shaft and formed thereon with a gear wheel, a second shaft parallel with the first named shaft, a gear wheel on the second shaft meshing with the first named gear wheel, a sleeve slidable on and rotatable with the first named shaft, one end of the sleeve being movable into said portion and said end of the sleeve and portion having clutch lugs to engage and disengage one another when the sleeve is moved into said portion, a gear wheel mounted loosely on the second shaft and geared to and slidable with said sleeve, the second and third named gear wheels having clutch portions to engage when the lugs of the sleeve are moved past the lugs of said cup-shaped portion, a gear wheel mounted loosely on the first named shaft, and a gear wheel secured to the second shaft and meshing with the fourth named gear wheel, the sleeve and fourth named gear wheel having clutch portions to engage when the sleeve is moved away from said cup-shaped portion.

In testimony whereof I have signed my name to this specification in the presence of two subscribing witnesses.

THOMAS J. McCLOSKEY.

Witnesses:
J. L. FITZPATRICK,
R. C. FRANKIE.